(12) United States Patent
Stallmann

(10) Patent No.: US 8,702,845 B2
(45) Date of Patent: Apr. 22, 2014

(54) SYSTEM AND METHOD FOR LOW NOX EMITTING REGENERATION OF DESICCANTS

(71) Applicant: ALSTOM Technology Ltd, Baden (CH)

(72) Inventor: Olaf Stallmann, Essenheim (DE)

(73) Assignee: ALSTOM Technology Ltd, Baden (CH)

( * ) Notice: Subject to any disclaimer, the term of this patent is extended or adjusted under 35 U.S.C. 154(b) by 0 days.

(21) Appl. No.: 14/019,585

(22) Filed: Sep. 6, 2013

(65) Prior Publication Data

US 2014/0004028 A1 Jan. 2, 2014

Related U.S. Application Data

(63) Continuation of application No. PCT/IB2012/000420, filed on Mar. 6, 2012.

(30) Foreign Application Priority Data

Mar. 8, 2011 (EP) .................................... 11157351

(51) Int. Cl.
*C01B 31/20* (2006.01)
*B01D 53/34* (2006.01)
*B01D 53/56* (2006.01)
*B01D 53/74* (2006.01)
*B01D 53/75* (2006.01)

(52) U.S. Cl.
USPC ................... 95/117; 95/118; 95/119; 95/121; 95/129; 96/121; 96/144; 422/168; 422/169; 422/170; 422/171; 422/187; 423/210; 423/220; 423/235

(58) Field of Classification Search
USPC .............. 95/117, 118, 119, 121, 129; 96/121, 96/144; 422/168–171, 187; 423/210, 220, 423/235
See application file for complete search history.

(56) References Cited

U.S. PATENT DOCUMENTS

| 3,137,549 A | 6/1964 | Kilgore et al. |
| 3,766,713 A | 10/1973 | Leonard |
| 4,421,532 A | 12/1983 | Sacchetti et al. |

(Continued)

FOREIGN PATENT DOCUMENTS

| DE | 1470669 | 11/1963 |
| EP | 1952874 | 8/2008 |
| GB | 1200806 | 8/1970 |
| WO | 2009/007937 | 1/2009 |

OTHER PUBLICATIONS

Kast, W., "Adsorption aus der Gasphase", pp. 204-205, Nov. 1988, Wiley-VCH.

*Primary Examiner* — Timothy Vanoy

(57) ABSTRACT

The invention pertains to a system for purification of a carbon dioxide rich flue gas generated in a boiler combusting a fuel in the presence of a gas containing oxygen, and being contaminated by NOx gases, wherein the system comprising one or more gas drier(s) comprising desiccants for removal of at least a portion of water content of the further compressed carbon dioxide rich flue gas; and a closed loop connected to the drier(s) for regeneration of desiccants of the drier(s) wherein the NOx gases are removed substantially separately from the water vapor. The invention pertains also to a method for removing the NOx gases substantially separately from the water vapor.

20 Claims, 4 Drawing Sheets

(56) References Cited

U.S. PATENT DOCUMENTS

| | | |
|---|---|---|
| 4,479,814 A | 10/1984 | Oliker |
| 4,533,365 A | 8/1985 | Ringel |
| 5,158,582 A | 10/1992 | Onitsuka et al. |
| 6,146,605 A | 11/2000 | Spokoyny |
| 8,012,446 B1 * | 9/2011 | Wright et al. .............. 423/437.1 |
| 8,535,417 B2 * | 9/2013 | Shah .............................. 95/139 |
| 2003/0037672 A1 | 2/2003 | Sircar |
| 2005/0132883 A1 | 6/2005 | Su et al. |
| 2010/0024476 A1 | 2/2010 | Shah |
| 2010/0322843 A1 | 12/2010 | Court et al. |
| 2013/0259787 A1 * | 10/2013 | Boos et al. .................... 423/235 |

* cited by examiner

(12)  United States Patent US 8,702,845 B2

SYSTEM AND METHOD FOR LOW NOX EMITTING REGENERATION OF DESICCANTS

CROSS-REFERENCE TO RELATED APPLICATIONS

This application claims priority to PCT/IB2012/000420 filed Mar. 6, 2012, which in turn claims priority to European application 11157351.5 filed Mar. 8, 2011, both of which are hereby incorporated in their entirety.

TECHNICAL FIELD

The present invention relates generally to the reduction of nitrogen oxides from flue gas. Particularly, the present invention relates to a system for low NOx emitting regeneration of desiccants. The present invention further relates to a method of regeneration of desiccants with low NOx emitting.

BACKGROUND

In the combustion of a fuel, such as coal, oil, peat, waste, etc., in a combustion plant, such as a power plant, a hot process gas is generated, such process gas containing, among other components, carbon dioxide $CO_2$.
With increasing environmental demands various processes for removing carbon dioxide from the process gas have been developed. One example of such a process is the so called oxy-fuel process. In an oxy-fuel process a fuel, such as one of the fuels mentioned above, is combusted in the presence of a nitrogen-lean gas. In the oxy-fuel combustion process a carbon dioxide rich flue gas is produced, which can be disposed of in order to reduce the emission of carbon dioxide. The carbon dioxide rich flue gases may also comprise contaminating gases, for example NOx gases. These contaminants shall also be removed. There are different methods available for removal of the nitrogen oxides from a gas flow, for example the NOx gases can be removed by using GPU offgas or by using a so called DeNOx unit, acting by catalytic reduction.

U.S. Pat. No. 6,146,605 describes methods like selective catalytic reduction (SCR) and selective non-catalytic reduction (SNCR), and combinations thereof, for reduction of NOx in flue gases. The NOx gases are herein removed by using ammonia ($NH_3$) as a reducing agent. This system is not connected to a system for regeneration of desiccants.

In U.S. Pat. No. 4,533,365 the gas containing NOx gases is separated by a molecular sieve and recycled into the system.

In previous used systems for regeneration of drying desiccants contaminants, like NOx gases, are coadsorbed. When the desiccants then were regenerated the NOx gases were also released, which resulted in disadvantageous concentration peaks of NOx in the regeneration offgas.

Therefore there is a need to solve the problem to avoid emitting or substantially avoid emitting NOx when regeneration of desiccants.

SUMMARY

An object of the present invention is to provide a system for purification of a carbon dioxide rich flue gas generated in a boiler combusting a fuel in the presence of a gas containing oxygen, and being contaminated by NOx gases.

An embodiment of the invention is a system for purification of a carbon dioxide rich flue gas generated in a boiler combusting a fuel in the presence of a gas containing oxygen, and being contaminated by NOx gases, wherein the system comprising
  one or more gas drier(s) comprising desiccants for removal of at least a portion of water content of the further compressed carbon dioxide rich flue gas;
  a closed loop connected to the drier(s) for regeneration of desiccants of the drier(s) wherein the NOx gases are removed substantially separately from the water vapor.
The system according to the invention generates only a low regeneration offgas stream which is an environmental advantage. Further, also the NOx emissions are reduced in comparison with known methods and also the peak emissions of NOx gases are avoided by the system.

Another advantage of the system is that the losses of $CO_2$ are reduced, less than 0.2% by volume are lost in the system according to the invention.

An embodiment of the invention is a system for purification of flue gas as above wherein the closed loop comprises a gas scrubber operating with a washing medium able to absorb the NOx gases removed from the drier during regeneration.

An embodiment of the invention is a system for purification of carbon dioxide rich flue gas as above wherein the water desorbed from the drier will be condensed in the scrubber.

In the system for purification of carbon dioxide rich flue gas according to the invention wherein the pH of the washing medium may be suitable adjusted to maximise washing of the gas.

An embodiment of the invention is a system for purification of carbon dioxide rich flue gas wherein the pH is suitably adjusted by adding a base selected from the group of ammonia ($NH_3$) and alkali hydroxide, like sodium hydroxide (NaOH).

Preferably one or more driers are connected in series, which open up for batch-wise regeneration of the driers. The closed loop for regeneration may continuously be connected to a gas drier ready for regeneration of its desiccants.

An embodiment of the invention is a system for purification of carbon dioxide rich flue gas as above wherein the system is working batch-wise.

An advantage of operating batch-wise is that the system may be optimised and that the overall heat input into the system is reduced due to optimised process sequence.

An object of the invention is to provide a method for purification of carbon dioxide rich flue gas generated in a boiler combusting a fuel in the presence of a gas containing oxygen, from contaminants, comprising the sequence of steps:
  a) drying a carbon dioxide rich flue gas by adsorption of water to the drier bed under coadsorption of NOx;
  b) isolating the drier from the overall process;
  c) pressure equalizing of the regeneration loop by connecting the drier to the closed loop whereby a substantially amount of the NOx gases is desorbed from the desiccant;
  d) elevating the temperature of the drier whereby water vapor is desorbed from the desiccant;
  e) washing the regeneration gas loaded with water and NOx in a gas scrubber comprising a washing medium, whereby the NOx gases are removed and water vapor is condensed into the washing medium;
  f) cooling the regenerated drier and venting the humid regeneration gas by refilling the system with $CO_2$ rich gas from the dried process stream;
  g) isolating the drier from the closed loop when the cooling step is finished;
  h) repressurization the drier to the process pressure using the dried process gas; and optionally i) bringing the regenerated drier on-stream when the other drier bed is loaded.

The step i) is performed when two or more driers are connected in series or in parallel (as shown in FIG. 3).

In step m) the pressure of the drier is preferably about 30-40 bar.

An embodiment of the invention is the method described hereinabove wherein the washing step e) includes the following sequence of steps:
- ei) venting the surplus of gases to keep the pressure in the heated system;
- eii) increasing the pressure of the regeneration gases using a blower or compressor to compensate pressure losses in the system;
- eiii) reheating the regeneration gases after water and NOx removal.
- eiv) reintroduction of the flue gas, substantially free from water vapor and the contaminating NOx gases, to the drier; and
- ev) isolating the scrubber when the desorption step is finished.

In an embodiment of the invention a method as above is provided wherein the pressure is kept by venting the surplus of gases to keep the pressure in the heated system at a suitable level.

In an embodiment of the present method the pressure of the regeneration gases may be increased. The pressure may be increased by using suitable means to compensate the pressure losses of the system. Suitable means may be, for example, a blower or compressor.

According to one embodiment of the method the regeneration gases are heated after the removal of water and NOx.

Then the flue gas, substantially free from water vapor and the contaminating NOx gases, is reintroduced to the drier.

After finalised desorption step, the gas scrubber is isolated from the drier included in the closed loop.

An embodiment of the invention is a method wherein the closed loop is keep at a pressure of about 15-25 bar before pressure equalizing in step c).

The washing medium as is circulated in the gas scrubber is water, optionally having an adjusted pH of about 5. The pH may be adjusted by adding a base, typically a base selected from ammonia ($NH_3$), or sodium hydroxide (NaOH).

An embodiment of the invention is a method wherein the desorbed water condenses in the gas scrubber, into the washing medium.

In an embodiment of the method of the invention wherein the pressure is kept above around 2 bar, preferably above around 10 bar.

An advantage of the method is that degradation of the desiccant caused by low temperature during depressurization may be minimised.

The step c) of the method described above may also comprise a step of heating the regeneration flue gas, preferably to a temperature of 160 to 230° C.

In addition, the method may comprise a step wherein the temperature of the flue gas in step d) may be additionally raised in order to remove the water from the drier. However, the temperature shall be kept within the interval of 160 to 230° C.

BRIEF DESCRIPTION OF THE DRAWINGS

The invention will now be described in more detail with reference to the appended drawings in which.

DETAILED DESCRIPTION

The gas for regeneration may comprise a mixture of inert gases as contaminants, such as $CO_2$, $N_2$, $O_2$, Ar etc. and flue gas and steam.

During the step of condensation of the steam into liquid it is important to maintain the pressure of at least 10 bar. This is obtained by adding inert gas, preferably by adding the inert gas before the regeneration gas blower.

Figure 1:
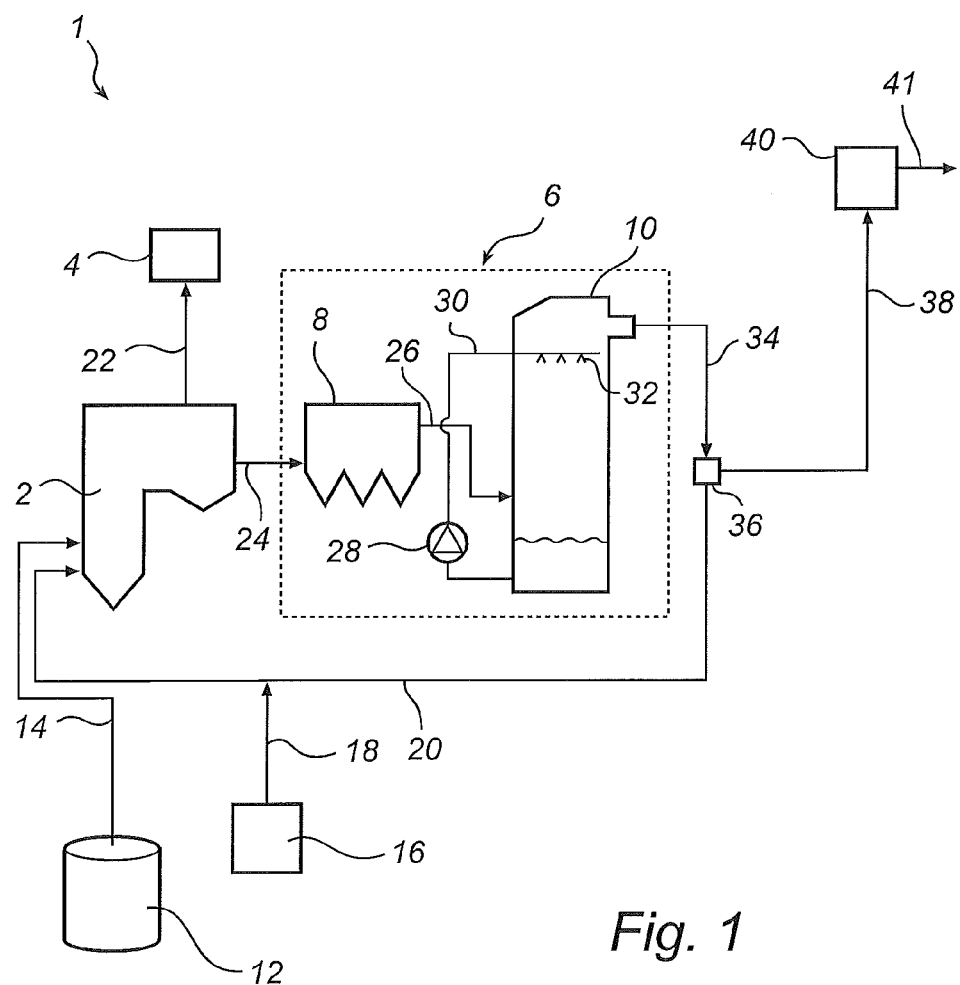
FIG. 1 is a schematic side view of a boiler system.

FIG. 1 is a schematic representation of a boiler system 1, as seen from the side thereof. The boiler system 1 comprises, as main components, a boiler 2, being in this embodiment an oxy-fuel boiler, a steam turbine electric power generation system, schematically indicated as 4, and a gas cleaning system 6. The gas cleaning system 6 comprises a particulate removal device, which may, for example, be a fabric filter or an electrostatic precipitator 8, and a sulphur dioxide removal system, which may be a wet scrubber 10.

A fuel, such as coal, oil, or peat, is contained in a fuel storage 12, and can be supplied to the boiler 2 via a supply pipe 14. An oxygen gas source 16 is operative for providing oxygen gas in a manner which is known per se. The oxygen gas source 16 may be an air separation plant operative for separating oxygen gas from air, an oxygen separating membrane, a storage tank, or any other source for providing oxygen gas to the boiler system 1. A supply duct 18 is operative for forwarding the produced oxygen gas, comprising typically 90-99.9 vol. % oxygen, $O_2$, to the boiler 2. A duct 20 is operative for forwarding re-circulated flue gas, which contains carbon dioxide, to the boiler 2. As indicated in FIG. 1, the supply duct 18 joins the duct 20 upstream of the boiler 2, such that oxygen gas and re-circulated flue gas, which contains carbon dioxide, may become mixed with each other to form a gas mixture containing typically about 20-50% by volume of oxygen gas, the balance being mainly carbon dioxide and water vapor, upstream of the boiler 2. Since almost no air enters the boiler 2 there is almost no nitrogen gas supplied to the boiler 2. In practical operation, less than 3% by volume of the gas volume supplied to the boiler 2 is air, which mainly enters the boiler system 1 as a leakage of air via, for example, the boiler 2 and the gas cleaning system 6. The boiler 2 is operative for combusting the fuel, that is to be supplied via the supply pipe 14, in the presence of the oxygen gas, mixed with the recirculated flue gas, which contains carbon dioxide, that is to be supplied via the duct 20. A steam pipe 22 is operative for forwarding steam, that will be produced in the boiler 2 as a result of the combustion, to the steam turbine electric power generation system 4, which is operative for generating power in the form of electric power.

A duct 24 is operative for forwarding carbon dioxide rich flue gas generated in the boiler 2 to the dust removal device 8. By "carbon dioxide rich flue gas" is meant that the flue gas leaving the boiler 2 via the duct 24 will contain at least 40% by volume of carbon dioxide, $CO_2$. Often more than 50% by volume of the flue gas leaving the boiler 2 will be carbon dioxide. Typically, the flue gas leaving boiler 2 will contain 50-80% by volume of carbon dioxide. The balance of the "carbon dioxide rich flue gas" will be about 15-40% by volume of water vapor ($H_2O$), 2-7% by volume of oxygen ($O_2$), since a slight oxygen excess is often preferred in the boiler 2, and totally about 0-10% by volume of other gases, including mainly nitrogen ($N_2$) and argon (Ar), since some leakage of air can seldom be completely avoided.

The carbon dioxide rich flue gas generated in the boiler 2 may typically comprise contaminants in the form of, for example, dust particles, hydrochloric acid, HCl, sulphur oxides, $SO_X$, and heavy metals, including mercury, Hg, that should be removed, at least partly, from the carbon dioxide rich flue gas prior to disposing of the carbon dioxide.

The dust removal device 8 removes most of the dust particles from the carbon dioxide rich flue gas. A duct 26 is operative for forwarding the carbon dioxide rich flue gas from the fabric filter 8 to the wet scrubber 10 of the gas cleaning system 6. The wet scrubber 10 comprises a circulation pump 28 which is operative for circulating, in a slurry circulation pipe 30, an absorption liquid, comprising for example lime stone, from the bottom of the wet scrubber 10 to a set of nozzles 32 arranged in the upper portion of the wet scrubber 10. The slurry nozzles 32 are operative for finely distributing the absorption liquid in the wet scrubber 10 to achieve good contact between the absorption liquid and the flue gas being forwarded to the wet scrubber 10 via the duct 26 and flowing substantially vertically upwards inside the wet scrubber 10 to effect efficient removal of sulphur dioxide, $SO_2$, and other acid gases from the carbon dioxide rich flue gas.

An at least partly cleaned carbon dioxide rich flue gas leaves the wet scrubber 10 via a duct 34 which forwards the flue gas to a gas splitting point 36, where the at least partly cleaned carbon dioxide rich flue gas is divided into two flows, namely a first flow, which via the duct 20 is re-circulated back to the boiler 2, and a second flow, which via a duct 38 is forwarded to a gas purification system in the form of a gas compression and purification unit (GPU) 40 of the boiler system 1. In the GPU 40 the cleaned carbon dioxide rich flue gas is further cleaned and is compressed for disposal. Compressed carbon dioxide hence leaves the GPU 40 via a duct 41 and is transported away for disposal, which is sometimes referred to as "$CO_2$ sequestration". The first flow, which is re-circulated back to the boiler 2 via duct 20, typically comprises 50-75% by volume of the total flow of the partly cleaned carbon dioxide rich flue gas leaving the wet scrubber 10. The second flow, typically comprising 25-50% by volume of the total flow of the partly cleaned carbon dioxide rich flue gas leaving the wet scrubber 10, is, hence, forwarded, via the duct 38, to the GPU 40, which will be described in more detail hereinafter.

Figure 2:
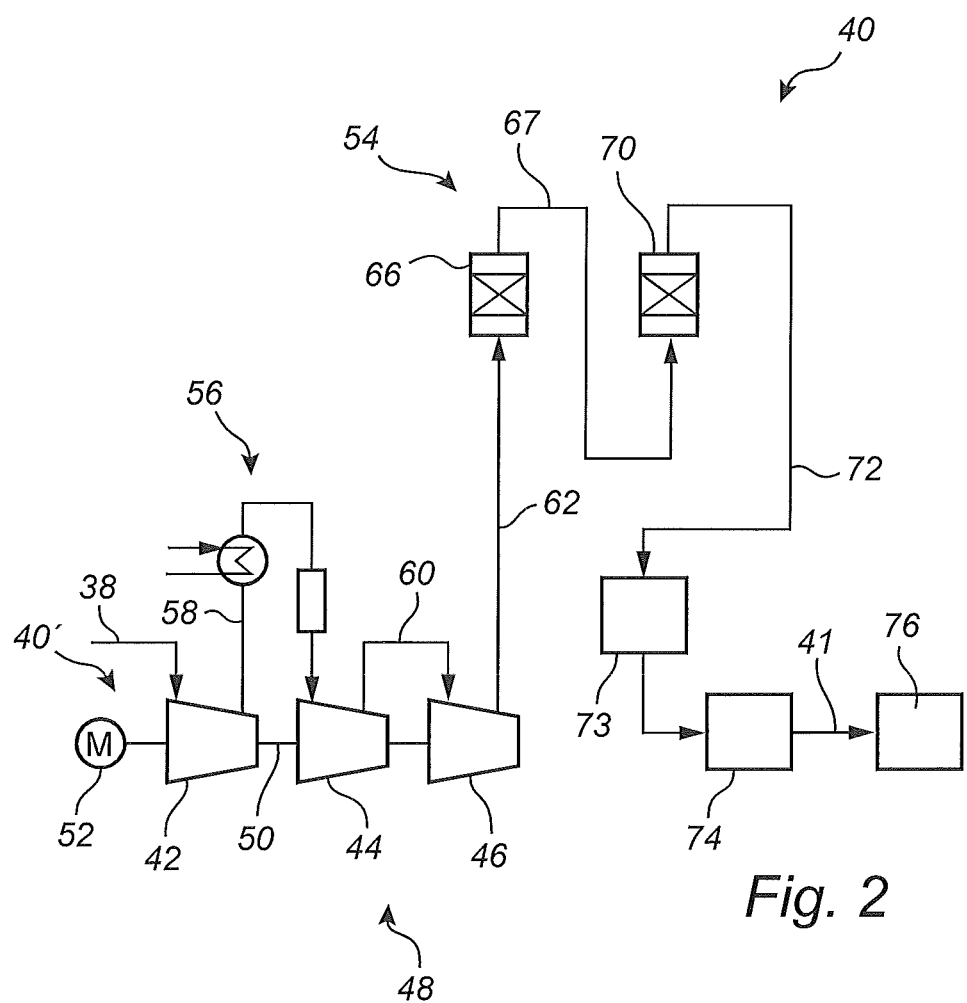
FIG. 2 is a schematic side view of a gas compression and purification unit.

FIG. 2 illustrates the GPU 40 in more detail. It will be appreciated that the illustration of FIG. 2 is schematic, and that a GPU may comprise further devices for gas purification etc.

The GPU 40 comprises at least one compressor having at least one, and typically two to ten compression stages for compressing the cleaned carbon dioxide rich flue gas. Each compression stage could be arranged as a separate unit. As alternative, and as illustrated in FIG. 2, several compression stages could be operated by a common drive. The GPU 40 of FIG. 2 comprises a compressor 40' having a first compression stage 42, a second compression stage 44, and a third compression stage 46. The first to third compression stages 42, 44, 46 form together a low pressure compression unit 48 of the GPU 40. The compression stages 42, 44, 46 are connected to a common drive shaft 50 which is driven by a motor 52 of the compressor 40'.

The GPU 40 may comprise at least one gas purification system intercooling. The GPU 40 may also comprise a mercury adsorption unit 54 which is arranged downstream of one of the compression stages 42, 44, 46. In the embodiment of FIG. 2, the mercury adsorption unit 54 is arranged downstream of the third compression stage 46, i.e., downstream of the low pressure compression unit 48. It will be appreciated that the mercury adsorption unit 54 could also have been arranged downstream of the first compression stage 42, or downstream of the second compression stage 44. It is also possible to arrange more than one mercury adsorption unit 54 in the GPU, for example a mercury adsorption unit downstream of the second compression stage 44, and a mercury adsorption unit 54 downstream of the third compression stage 46. Still further, it is also possible to arrange an intercooling unit 56, having the intercooling functionality of the intercooling and mercury adsorption unit 54 but lacking the mercury adsorption functionality thereof, downstream of some, or all, of those compression stages that have no inter-cooling and mercury adsorption unit 54 arranged downstream thereof. Hence, intercooling units 56 may be arranged downstream of the first, and second compression stages 42, and 44 of the GPU 40 of FIG. 2. One such optional intercooling unit 56 is illustrated downstream of the first compression stage 42.

The cleaned carbon dioxide rich flue gas enters the GPU 40 via the duct 38 and is introduced into the first compression stage 42. A duct 58 forwards, optionally via the intercooling unit 56, the compressed gas from the first compression stage 42 to the second compression stage 44. A duct 60 forwards, optionally via a not shown intercooling unit, the compressed gas from the second compression stage 44 to the third compression stage 46. A duct 62 forwards the compressed gas from the third compression stage 46 to the inter-cooling and mercury adsorption unit 54.

The main parts of the mercury adsorption unit 54 are, a mercury adsorber 66, and a gas drier unit 70. The mercury adsorber operates for removing at least a portion of the mercury content of the compressed gas.

The gas drier unit 70 serves to remove at least a portion of the content of water vapor of the compressed $CO_2$ rich flue gas. The parts of the gas drier unit will be described in more detail hereinafter with reference to FIG. 3.

Figure 3:
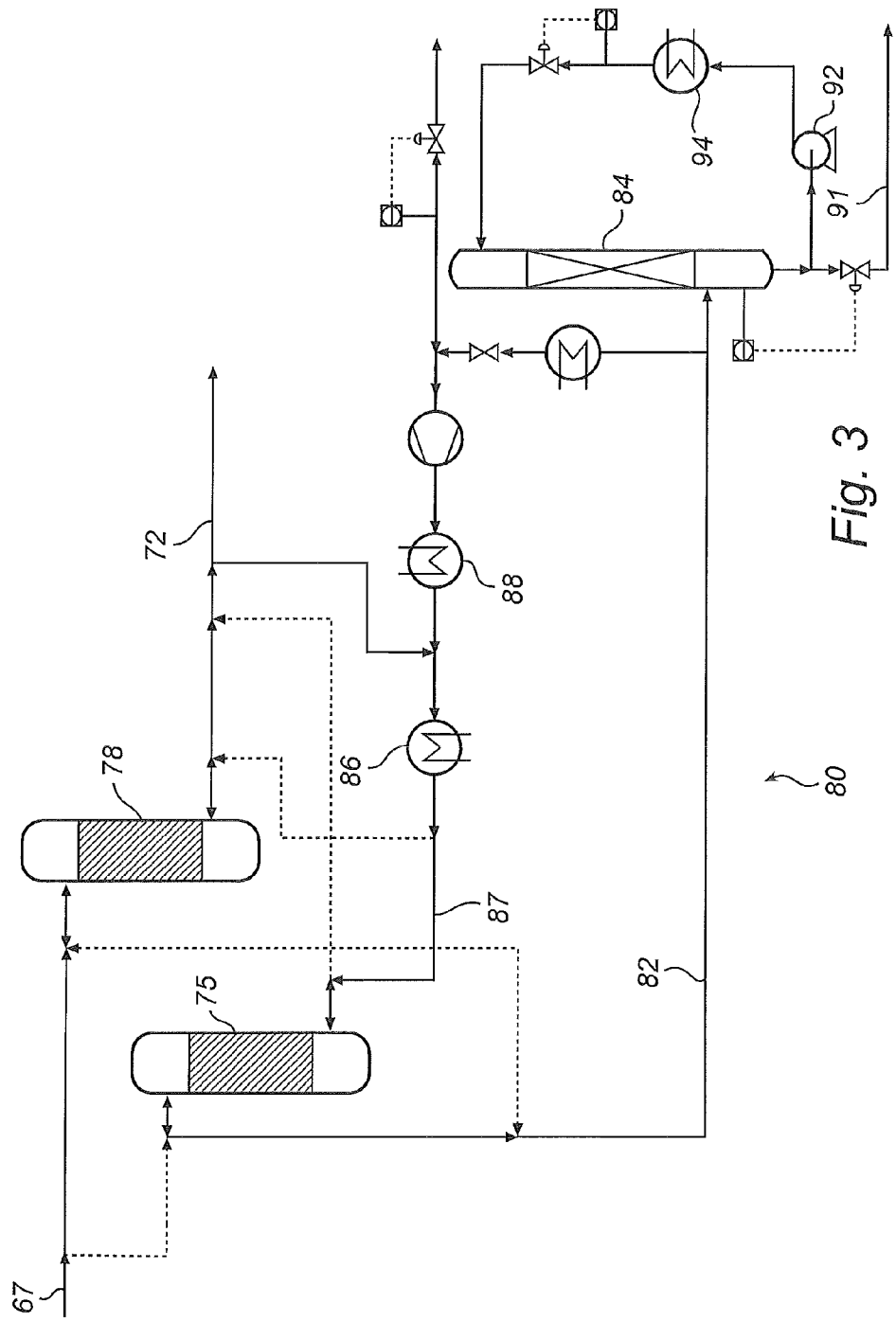
FIG. 3 is a schematic side view of the gas drier unit with a closed loop.

The gas drier unit 70 comprises one or more gas driers, connected in series or in parallel (as shown in FIG. 3). No matter which system, each of them shows the feature that at least one drier can be taken out of operation (in FIG. 3 is drier 75 taken out of operation) while at least one drier of the other driers (drier 78 in FIG. 3) is on-line in order to ensure continuous operation.

The driers contain a suitable desiccant for absorbing the water from the carbon dioxide rich flue gas. Any desiccant is suitable for the system and method of the invention, preferred desiccants may be selected from molecular sieve, silica gel, zeolite and equivalents to those.

To the gas drier(s) is a closed loop 80 for regeneration of desiccants connected.

The cleaned carbon dioxide rich flue gas comprising water vapor, the wet flue gas, and traces of contaminants enters the GPU 40 via the duct 67. The flue gas is forwarded through the drier.

The duct 67 forwards the flue gas to a splitting point

The duct 82 forwards the flue gas comprising water vapor and NOx gases to the gas scrubber 84 wherein the gas meets a washing medium back-stream. The washing medium, for example water with adjusted pH, is fed to the top of the gas scrubber via suitable means 92, such as a pump. Adjustment of temperature is made via a recycle cooler 94. The washing medium may also be forwarded from the washing loop to waste water treatment via a duct 91. The regeneration of the water loaded driers follows the following sequence of steps:

a) drying a carbon dioxide rich flue gas by adsorption of water to the drier bed; the drier 75 is loaded to the adsorption limit with water, which also will be the starting point of the regeneration procedure, at this point the drier is also loaded with NOx due to the coadsorption;

b) the drier is isolated from the process described in FIG. 2, by closing the valve 69;

c) pressure equalizing of the regeneration loop by connecting the drier to the closed loop by opening a not shown valve, whereby the NOx gases partly desorb from the desiccant; the NOx gases are forwarded to the gas scrubber 84 via the duct 82;

d) elevating the temperature of the drier 75 whereby the water vapor is desorbed from the desiccant; the flue gas comprising the desorbed water vapor is forwarded to the gas scrubber 84 via the duct 82;

e) the water and NOx loaded regeneration gases is washed in the gas scrubber 84 comprising a washing medium, whereby the NOx gases are removed and water vapor is condensed into the washing medium;

ei) venting the surplus of gases to keep the pressure in the heated system;

eii) increasing the pressure of the recirculating portion of the regeneration gases using a blower or compressor to compensate pressure losses in the system;

eiii) reheating the regeneration gases in the regeneration heater 86, after water and NOx removal;

eiv) reintroduction the flue gas, substantially free from water vapor and the contaminating NOx gases, to the drier, forwarded in the duct 87;

ev) isolating the gas scrubber when the desorption step is finished by closing valves;

f) cooling the regenerated drier 75 and vent the humid regeneration gas by refilling the system with $CO_2$ rich gas from the dried process stream and forwarded via duct 87;

g) isolating the drier when the cooling step is finished by closing valves (not shown);

h) the drier 75 is again pressurised to the pressure of the overall process, preferably to a pressure of 30-40 bar, using the dried process gas;

i) the regenerated drier is brought on-stream when the other drier bed is loaded.

The pH of the washing medium is adjusted by adding a base, typically selected from ammonia ($NH_3$), caustic soda (NaOH), but the list is not exhaustive to these.

The duct comprises, before the drier, a valve with which the regeneration gas drier unit 80 is connected or disconnected to the duct 67.

A gas splitting point is preferably placed before the drier 75.

The regeneration flue gas is forwarded to the gas scrubber unit via a duct 82 from the gas drier 75.

In the gas scrubber 84 the regeneration flue gas is introduced in the bottom of the adsorber (via duct 82) and forwarded back-stream the washing medium which is introduced in the top of the gas drier.

The washing medium, for example water, is recycled in a loop with a recycle pump 92. Temperature of the washing medium is adjusted via a recycle cooling system 94. The washing medium passing the gas scrubber may be forwarded via a duct 91 to further waste water treatment.

The regeneration flue gas forwarded from the gas scrub back to the drier contains some amounts of nitrogen oxide gases and water vapor and some amounts of nitrogen oxide gases.

The regeneration flue gas from the gas scrubber is recycled to the drier, optionally by a gas blower, compressor or other similar means.

The regeneration flue gas passing the drier unit 70 is then transported to a $CO_2$ liquefaction unit and/or further units of the GPU.

The gas drier unit 75, when connected to the process via duct 67 is kept under a higher pressure than the closed loop for regeneration is operating at. The pressure kept in the gas drier unit 75 and in the process is about 30-40 bar before the closed regeneration loop 80 is connected to the gas drier.

The system comprising the gas drier 75 and the connected closed regeneration loop 80 is kept at a pressure of 15-25 bar.

The nitrogen oxide gases are released in substantially amounts as the first component forwarded to the regeneration loop.

The regeneration gas forwarded from the driers in the gas drier unit may be combined with the gas re-circulated from the gas scrubber.

A duct 72 forwards the compressed gas, from which at least a portion of its mercury content, and at least the major part of the water vapor content has been removed, from the dryer unit 70 to optional further units of the GPU 40 (shown in FIG. 2). Examples of such optional further units of the GPU 40 include a non-condensable gas removal unit, for example a $CO_2$ liquefaction unit 73, in which the gas is cooled in a heat-exchanger, often called a cold-box, to cause liquefaction of the carbon dioxide such that the carbon dioxide can be separated from gases, such as nitrogen, that are not liquefied at the same temperature as carbon dioxide. Furthermore, the GPU 40 may comprise a high pressure compression unit 74 arranged downstream, as seen with respect to the transport direction of the carbon dioxide, of the $CO_2$ liquefaction unit 73, and comprising one or more compression stages for compressing the carbon dioxide to a suitable pressure for sequestration. After compression of the gas in the high pressure compression unit 74, the compressed carbon dioxide, which may be in a supercritical or liquid state, is forwarded, via duct 41, to a $CO_2$ sequestration site 76.

Figure 4:
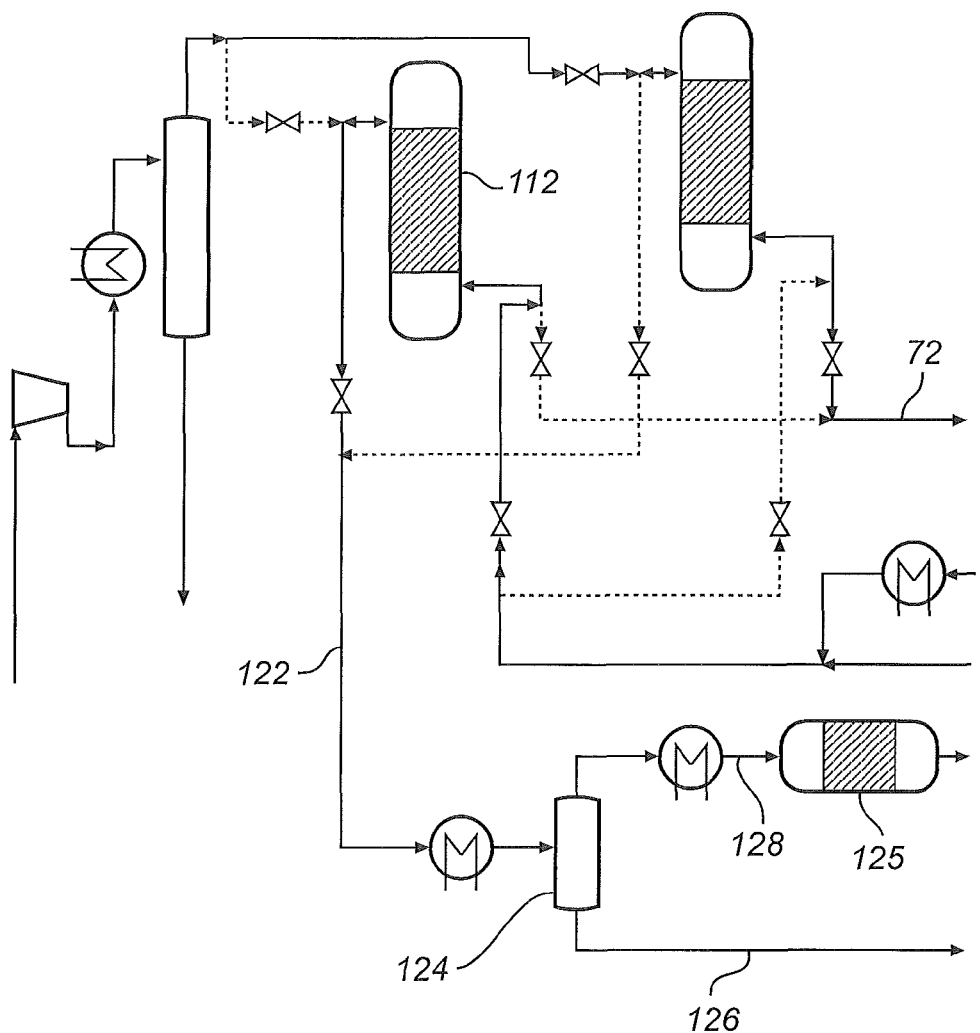
FIG. 4. is a schematic side view of a prior art regeneration unit.

FIG. 4. Shows as a prior art system for NOx removal system comprising two driers. When the gas drier 112 in this system will be regenerated it is disconnected the process system via the valve. The regeneration flue gas flue gas is separated from the water vapor. The water vapor is condensed and forwarded for further treatment of waste water via duct 126.

The regeneration flue gas is forwarded from the drier 112 via duct 122 to the regeneration gas separator 124 via a duct to the unit 125 for separating the NOx gases, a DeNOx unit. The NOx gases are herein transformed into nitrogen gas by a process which can be catalytic. During the separation of the NOx gases, the gas is released which leads to concentration peaks in the regeneration offgas. When the drier 112 is treated, depressurized and flushed, after finalised regeneration there is a loss of $CO_2$ of the treated stream. This loss can be up to 3% of $CO_2$.

While the invention has been described with reference to a number of preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another

The invention claimed is:

1. A system for purification of a carbon dioxide rich flue gas generated in a boiler combusting a fuel in the presence of a gas containing oxygen, and being contaminated by NOx gases, wherein the system comprising
    one or more gas drier(s) comprising desiccants for removal of at least a portion of water content of the further compressed carbon dioxide rich flue gas; and
    a closed loop connected to the drier(s) for regeneration of desiccants of the drier(s) wherein the NOx gases are removed substantially separately from the water vapor.

2. A system for purification of flue gas according to claim 1 wherein the closed loop comprises a gas scrubber operating with a washing medium able to absorb the NOx gases removed from the drier during regeneration.

3. A system for purification of carbon dioxide rich flue gas according to claim 1 wherein the water desorbed from the drier will be condensed in the gas scrubber.

4. A system for purification of carbon dioxide rich flue gas according to claim 1 wherein the pH of the washing medium is suitable adjusted to maximise washing of the gas.

5. A system for purification of carbon dioxide rich flue gas according to claim 1 wherein the pH is suitably adjusted by adding a base selected from the group of ammonia and alkali hydroxide.

6. A system for purification of carbon dioxide rich flue gas according to claim 1 wherein the system is working batchwise.

7. A method for purification of carbon dioxide rich flue gas generated in a boiler combusting a fuel in the presence of a gas containing oxygen, from contaminants, the method comprising:
    a) drying a carbon dioxide rich flue gas by adsorption of water to the drier bed under coadsorption of NOx;
    b) isolating the drier from the process;
    c) pressure equalizing of the regeneration loop by connecting the drier to the closed loop whereby a substantial amount of the NOx gases is desorbed from the desiccant;
    d) elevating the temperature of the drier whereby also water vapor is desorbed from the desiccant;
    e) washing the regeneration gas loaded with water and NOx in a gas scrubber comprising a washing medium, whereby the NOx gases are removed and water vapor is condensed into the washing medium; and
    f) cooling the regenerated drier and venting the humid regeneration gas by refilling the system with $CO_2$ rich gas from the dried process stream;
    g) isolating the drier when the cooling step is finished;
    h) repressurization of the drier to the process pressure using the dried process gas; and optionally
    i) bringing the regenerated drier on-stream when the other drier bed is loaded.

8. A method according to claim 7 wherein the washing step e) comprises:
    ei) venting the surplus of gases to keep the pressure in the heated system;
    eii) increasing the pressure of the regeneration gases using a blower or compressor to compensate pressure losses in the system;
    eiii) reheating the regeneration gases after water and NOx removal;
    eiv) reintroduction of the flue gas, substantially free from water vapor and the contaminating NOx gases, to the drier; and
    ev) isolating the scrubber when the desorption step is finished.

9. A method according to claim 7 wherein the closed loop is at a pressure of about 15-25 bar before pressure equalizing in step c).

10. A method according to claim 7 wherein the washing medium is water, optionally having pH adjusted to about 5.

11. A method according to claim 7 wherein the pH is adjusted by adding a base.

12. A method according to claim 7 wherein the desorbed water condenses in the gas scrubber.

13. A method according to claim 7 wherein the pressure is kept above around 2 bar.

14. A method according to claim 7 wherein step c) also comprising heating the regeneration flue gas.

15. A method according to claim 7 wherein the temperature of the flue gas in step d) may be additionally raised in order to remove the water from the drier.

16. A system for purification of carbon dioxide rich flue gas according to claim 5 wherein the alkali hydroxide is sodium hydroxide.

17. A method according to claim 7 comprising:
    performing the repressurization of the drier to the process pressure at about 30-40 bar.

18. A method according to claim 11 wherein the base is selected from ammonia or sodium hydroxide.

19. A method according to claim 13 wherein the pressure is kept above around 10 bar.

20. A method according to claim 14 comprising:
    heating the regeneration flue gas to a temperature of about 160° C. to 230° C.

* * * * *